United States Patent Office 3,189,576
Patented June 15, 1965

3,189,576
ORGANOSILICON INTERMEDIATES CONTAINING SILICON-BONDED OXIME RADICALS
Edward Sweet, Midland, Mich., assignor to Dow Corning Corporation, Midland, Mich., a corporation of Michigan
No Drawing. Filed Sept. 7, 1962, Ser. No. 222,167
25 Claims. (Cl. 260—46.5)

This invention relates to new organosilicon intermediates containing as essentially the only functional groups silicon-bonded oxime radicals, the use of these intermediates in one-component room temperature curing systems and methods of preparing both the intermediates and the room temperature curing systems.

This application is a continuation-in-part of applicant's copending application Serial No. 132,555, filed August 21, 1961, now abandoned, which is in turn a continuation-in-part of and was copending with applicant's application Serial No. 91,636, filed February 27, 1961 now abandoned, both of which are entitled "Silicone Intermediates."

The desirability of room temperature curing systems is now well established. Resinous systems are used primarily in coating applications such as in wood lacquers. Elastometric systems are used both in coating applications and in calking applications. The first room temperature curing systems involved two or more stable components which when mixed together cured spontaneously to some desired solid material. Such systems could not be marketed as one-component systems due to their spontaneous interaction resulting in curing the system to a solid, unworkable state.

Subsequently, it was found that certain fluid organopolysiloxanes containing silicon-bounded acyloxy radicals as the only reactive groups were stable in the absence of moisture but cured in the presence of moisture to resinous or elastomeric solids depending on the organopolysiloxane structure and composition. The curing of this one-component system is accompanied by the evolution of a carboxylic acid, generally acetic acid with present commercial materials. This one-component system has been a great commercial success. However, there are some applications in which the presence of the carboxylic acid produced by this system is undesirable and detrimental. The desirability of a commercially competitive product having universal application has made more urgent the perfection of other possible one-component room temperature curing organopolysiloxane systems.

The discovery of a new class of organopolysiloxane intermediates has made possible the preparation of a new one-component room temperature curing system. The characteristics of the final cured product can be widely varied by variation in the composition and structure of the intermediate employed.

The primary object of this invention is to provide new organosilicon intermediates. Another object is to provide a new one-component room-temperature-curing organopolysiloxane system which is stable in the absence of moisture. Another object is to provide such a product which is free of acid. Another object is to provide methods for employing the new intermediates in preparing the new room-temperature-curing system.

The new class of organosilicon intermediates of this invention consists of silanes of the general formula $(X=NO)_aSiR'_{4-a}$ in which X is a radical of the group $R_2C=$ and

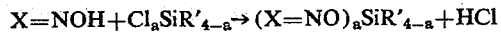

in which each R" is a divalent hydrocarbon radical or a halogenated divalent hydrocarbon radical, each R can be a monovalent hydrocarbon radical or a halogenated monovalent hydrocarbon radical, each R' can be an R radical, a cyanoalkyl radical or a hydrogen atom and $a$ can be 1, 2, 3 or 4. Thus, these silanes include $X=NOSiR'_3$, $(X=NO)_2SiR'_2$, $(X=NO)_3SiR'$ and $Si(ON=X)_4$.

The silanes of this invention are best prepared by mixing an oxime $X=NOH$ with a halogenosilane, preferably a chlorosilane $Cl_aSiR'_{4-a}$, in the presence of an acid acceptor such a pyridine or alpha-picoline and distilling the fluid products. The reaction goes generally as follows:

$$X=NOH + Cl_aSiR'_{4-a} \rightarrow (X=NO)_aSiR'_{4-a} + HCl$$

The reaction is best carried out in the substantial absence of moisture since the latter interferes with the reaction. However, traces of moisture are not harmful, particularly if an excess of the oxime is employed.

The reaction of this invention can be carried out at any convenient temperature although, in general, temperatures ranging from 20° to 100° C. are sufficient.

If desired, the reaction can be carried out in the presence of an inert solvent, i.e., a solvent which will not react with the oxime groups on the silicon. Suitable solvents include hydrocarbons such as benzene, toluene, xylene or petroleum ethers; halogenated solvents perchloroethylene or chlorobenzene and organic ethers such as diethylether and dibutylether; ketones such as methylisobutylketone and fluid hydroxyl-free siloxanes. The presence of solvents is particularly desirable when the oxime is reacted with chlorine-containing siloxanes as described infra particularly when the siloxane is in the form of a high molecular weight gum. In these cases, the presence of the solvent redues the overall viscosity of the mixture and facilitates the reaction. If desired, the composition may be kept in the solvent until it is to be used. This is particularly valuable when a gummy product is to be employed in coating applications.

For the purpose of this invention R" can be any divalent hydrocarbon radical or divalent halohydrocarbon radical in which the two valences are attached to the C of the C=NO— group. Thus, for example, R" can be

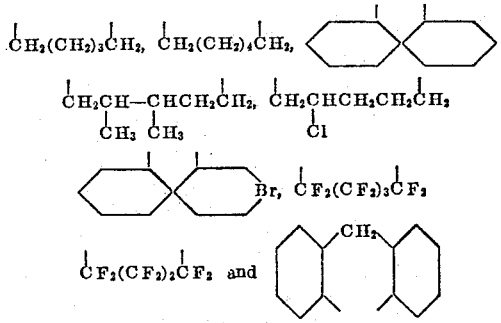

In the compositions of this invention each R and R' can be any monovalent hydrocarbon radical or any halogenated monovalent hydrocarbon radical. More specifically R and R' can be, for example, any alkyl radical such as the methyl, ethyl, isopropyl, tert-butyl, 2-ethylhexyl, dodecyl, 1-isobutyl-3,5-dimethylhexyl, octadecyl and myricyl radicals; any alkenyl radical such as the vinyl, allyl, decenyl and hexadienyl radicals; an cycloalkyl radical such as the cyclopentyl and cyclohexyl radicals; any cycloalkenyl radical such as the cyclopentenyl, cyclohexenyl and cyclo-2,4-hexadienyl radicals; any aryl radical such as the phenyl, naphthyl and xenyl radicals; any aralkyl radical such as the benzyl, phenlethyl and xylyl radicals and any alkaryl radical such as the tolyl and dimethylphenyl radicals. These monovalent hydrocarbon radicals can be halogenated to give such radicals as the chloromethyl, 3,3,3 - trifluoropropyl, 3,3,4,4,5,5,5 - heptafluoropentyl, perchlorophenyl, 3,4-dibromocyclohexyl, α,α,α-trifluorotolyl, 2,4-dibromobenzyl, difluoromonochlorovinyl, α,β,β-trifluoro-α-chlorocyclobutyl and 2-iodocyclopenten-3-yl radicals, all of which are operative.

In addition R' can be any cyanoalkyl radical such as the beta-cyanoethyl, gamma-cyanopropyl, omega-cyanobutyl, beta-cyanopropyl, gamma-cyanobutyl and omega-cyanooctadecyl radicals. When cyanoalkyl radicals are present, it is preferred that they be attached to at least 1 mol percent of the silicon atoms in the compounds of this invention.

The halogenosilanes employed in the preparation of the silanes of this invention are well known in the art.

The oximes which can be employed in the preparation of the silanes of this invention include, for example, acetophenone oxime, acetone oxime, benzophenone oxime, 2-butanone oxime, 3-methyl-2-butanone oxime, d-camphor oxime, alpha-d-carvone oxime, 2-nonanone oxime, 5-methyl-2-hexanone oxime, 2-penanone oxime, diisopropylketone oxime, cyclopentanone oxime, cyclohexanone oxime, acrylophenone oxime, 1-acetonaphthone oxime, 1-phenyl-2-butanone oxime, chlorocyclohexanone oxime, perfluorocyclobutanone oxime, 4-phenyl-2-butanone oxime, 5-isopropyl-2-methylacetophenone oxime, 12-tricosanone oxime, alpha-bromo-2,4,6-trimethylisobutyrophenone oxime, alpha-bromoacetaphenone oxime, anthrone oxime, p-chloroacetophenone oxime and p,α-diand can be prepared by any of the standard oxime syntheses.

The oxime-substituted silanes shown above can be polymerized by partial hydrolysis and condensation to form oxime-substituted polysiloxanes made up of units of the general formula

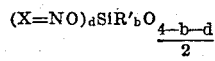

in which each R and R' are as defined above, each b is 0, 1 or 2, each d is 1, 2 or 3, and the sum of b and d is less than 4.

The oxime-substituted silanes of this invention can also be used to introduce controllable functionality into siloxane polymers. One method comprises reacting in the substantial absence of moisture a hydroxy-endblocked siloxane composed of units of the general formula

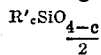

in which each c can have a value of 0, 1, 2 or 3, preferably 2, and the average value of c in each molecule is at least 1. with a silane of the formula R'$_b$Si(ON=X)$_{4-b}$, in which b can have a value of 0, 1 or 2. Each R and R' are as defined above. There must be at least one mol of silane, preferably at least a two-fold excess, per mol of silicon-bonded hydroxyl groups.

Another method comprises the preliminary preparation of a halogen-endblocked siloxane by the reaction in contact with a hydrogen halide acceptor, e.g. pyridine, and in the substantial absence of moisture of a halogenosilane of the general formula R'$_b$SiX$_{4-b}$, in which R' and b are as defined above and X is a halogen atom, preferably chlorine, with a hydroxylated organosilicon compound such as a silanediol, a silanetriol or a hydroxy-endblocked siloxane as defined above. There is preferably about one halogenosilane molecule per silicon-bonded hydroxyl group in the hydroxylated organosilicon compound. The halogenosilane and hydroxylated polysiloxane must be such that there is an average of atleast one R' radical per silicon atom in the resulting halogenosiloxane. The resulting halogenosiloxane is then reacted preferably in contact with another hydrogen halide acceptor, in the substantial absence of moisture with an oxime. There must be at least one mol of oxime, preferably at least a twofold excess, per mol of silicon-bonded halogen atoms.

A third method involves the use of those silanes shown above which contain an alkenyl radical attached to the silicon atom. They are used to prepare the products of this invention which contain the ≡SiR'''Si linkage. Such compounds are best prepared by reacting silanes (1) of the formula

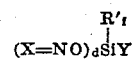

in which Y is an alkenyl radical and f is an integer from 0 to 2 inclusive with (2) silanes of the formula

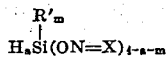

and/or siloxanes having at least one silicon-bonded hydrogen atom in the molecule. The reaction results in the addition of some or all of the silicon-bonded hydrogens to the C=C linkage of Y to give the ≡SiR'''Si≡ linkage. This reaction is best carried out in the presence of catalysts such as platinum, platinum salts, chloroplatinic acid or under the influence of ultra violet light or by the other methods shown in the art for the addition of SiH to C=C.

When reactant (2) is a silane the product of the reaction has the formula

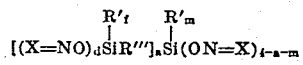

in which X and R' are as above defined, d is an integer from 1 to 3 inclusive, f is an integer from 0 to 2 inclusive, a is an integer from 1 to 4 inclusive, m is an integer from 0 to 3 inclusive, the sum of a+m being not greater than 4 and R''' is a divalent aliphatic hydrocarbon radical such as —(CH$_2$)$_2$—, —(CH$_2$)$_3$—, —(CH$_2$)$_{18}$— or $$-CH_2\overset{Me}{\underset{|}{C}}HCH_2-$$

When reactant (2) is a siloxane the product is a siloxane containing at least one siloxane unit of the formula

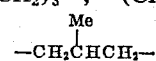

The reaction is thus capable of giving either silanes, or siloxanes having at least one (X=NO) group per molecule. Any of these products can be partially hydrolyzed by standard techniques to remove some of the (X=NO) groups.

The siloxanes containing the SiR'''Si linkage can be any siloxane having at least one siloxane unit of the formula

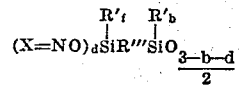

in which X, R' and R''' are as above defined, d and d' are each integers from 0 to 3, f is an integer from 0 to 2, b is an integer from 0 to 2 and the sum of d+d'+f+b being not greater than 5. Any remaining siloxane units in said siloxane are of the formula

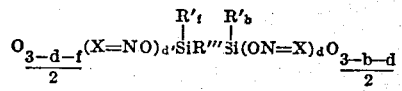

in which c is an integer from 0 to 3 inclusive.

To summarize the siloxanes which are within the scope of this invention include any siloxane having at least one siloxane unit of the formula

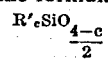

in which z is 0 or 1, f is 0 to 2, d and d' are each 0 to 3, b is 0 to 2, there being at least one X=NO— radical and at least one SiO linkage in said unit, any remaining siloxane units in said siloxane being of the formula

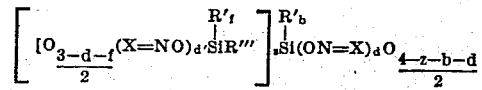

in which R' and c are as above defined.

The siloxanes having no SiR'''Si linkages include any of the following siloxane units: R'$_3$SiO$_{0.5}$, R'$_2$SiO,

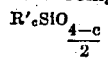

$X=NOSiO_{1.5}$, $(X=NO)_2SiR'O_{0.5}$, $X=NOSiR'_2O_{0.5}$ and $X=NOSiR'O$ units. These units can be combined into a variety of polymers such as, for example:

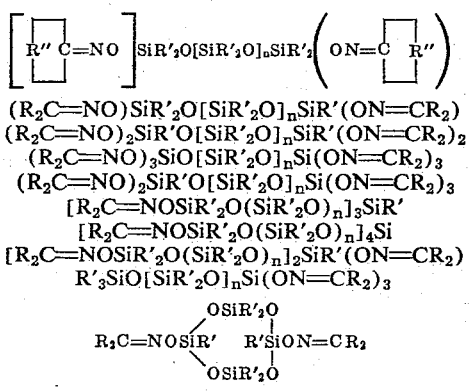

$(R_2C=NO)SiR'_2O[SiR'_2O]_nSiR'(ON=CR_2)$
$(R_2C=NO)_2SiR'O[SiR'_2O]_nSiR'(ON=CR_2)_2$
$(R_2C=NO)_3SiO[SiR'_2O]_nSi(ON=CR_2)_3$
$(R_2C=NO)_2SiR'O[SiR'_2O]_nSi(ON=CR_2)_3$
$[R_2C=NOSiR'_2O(SiR'_2O)_n]_3SiR'$
$[R_2C=NOSiR'_2O(SiR'_2O)_n]_4Si$
$[R_2C=NOSiR'_2O(SiR'_2O)_n]_2SiR'(ON=CR_2)$
$R'_3SiO[SiR'_2O]_nSi(ON=CR_2)_3$

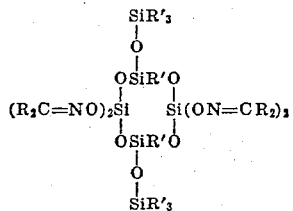

and

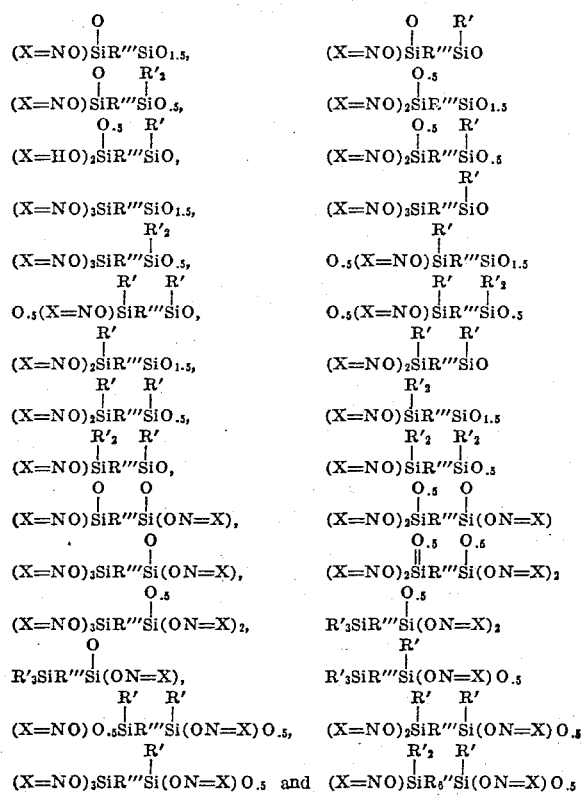

In each case R and R' can be any radicals defined above and each $n$ can be any positive integer, i.e., 1; 10; 100; 1,000; 10,000 or more.

The siloxanes which contain the SiR'''Si linkage can include, for example, any of the following siloxane units $R'_3SiO_{.5}$, $R'_2SiO$, $R'SiO_{1.5}$, $SiO_2$ in combination with any of the following siloxane units:

$(X=NO)\overset{O}{\underset{|}{Si}}R'''SiO_{1.5}$,   $(X=NO)\overset{O}{\underset{|}{Si}}R'''\overset{R'}{\underset{|}{Si}}O_{.5}$ $(X=NO)\overset{O}{\underset{|}{Si}}R'''\overset{R'_2}{\underset{|}{Si}}O_{.5}$,   $(X=NO)_2\overset{O_{.5}}{\underset{|}{Si}}R'''SiO_{1.5}$ $(X=HO)_2\overset{O_{.5}}{\underset{|}{Si}}R'''\overset{R'}{\underset{|}{Si}}O$,   $(X=NO)_2\overset{O_{.5}}{\underset{|}{Si}}R'''\overset{R'}{\underset{|}{Si}}O_{.5}$ $(X=NO)_3SiR'''SiO_{1.5}$,   $(X=NO)_3SiR'''\overset{R'}{\underset{|}{Si}}O$ $(X=NO)_3\overset{R'_2}{\underset{|}{Si}}R'''SiO_{.5}$,   $O_{.5}(X=NO)\overset{R'}{\underset{|}{Si}}R'''SiO_{1.5}$ $O_{.5}(X=NO)\overset{R'}{\underset{|}{Si}}R'''\overset{R'}{\underset{|}{Si}}O$,   $O_{.5}(X=NO)\overset{R'}{\underset{|}{Si}}R'''\overset{R'_2}{\underset{|}{Si}}O_{.5}$ $(X=NO)_2\overset{R'}{\underset{|}{Si}}R'''SiO_{1.5}$,   $(X=NO)_2\overset{R'}{\underset{|}{Si}}R'''\overset{R'}{\underset{|}{Si}}O$ $(X=NO)_2\overset{R'}{\underset{|}{Si}}R'''SiO_{.5}$,   $(X=NO)\overset{R'_2}{\underset{|}{Si}}R'''\overset{R'_2}{\underset{|}{Si}}O_{1.5}$ $(X=NO)\overset{R'_2}{\underset{|}{Si}}R'''\overset{R'}{\underset{|}{Si}}O$,   $(X=NO)\overset{R'_2}{\underset{|}{Si}}R'''\overset{R'}{\underset{|}{Si}}O_{.5}$ $(X=NO)\overset{O}{\underset{|}{Si}}R'''Si(ON=X)$,   $(X=NO)_2\overset{O_{.5}}{\underset{|}{Si}}R'''\overset{O}{\underset{|}{Si}}(ON=X)$ $(X=NO)_3\overset{O}{\underset{|}{Si}}R'''Si(ON=X)$,   $(X=NO)_2\overset{O_{.5}}{\underset{|}{Si}}R'''\overset{O_{.5}}{\underset{|}{Si}}(ON=X)_2$ $(X=NO)_3\overset{O_{.5}}{\underset{|}{Si}}R'''Si(ON=X)_2$,   $R'_3SiR'''\overset{O_{.5}}{\underset{|}{Si}}(ON=X)_2$ $R'_3\overset{O}{\underset{|}{Si}}R'''Si(ON=X)$,   $R'_3SiR'''\overset{R'}{\underset{|}{Si}}(ON=X)O_{.5}$ $(X=NO)O_{.5}\overset{R'}{\underset{|}{Si}}R'''\overset{R'}{\underset{|}{Si}}(ON=X)O_{.5}$,   $(X=NO)_2\overset{R'}{\underset{|}{Si}}R'''\overset{R'}{\underset{|}{Si}}(ON=X)O_{.5}$ $(X=NO)_3SiR'''\overset{R'}{\underset{|}{Si}}(ON=X)O_{.5}$ and $(X=NO)\overset{R'_2}{\underset{|}{Si}}R_3'''\overset{R'}{\underset{|}{Si}}(ON=X)O_{.5}$ These units can be combined into a variety of polymers employing any combination of the above units so long as the resulting siloxane contains at least one $X=NO-$ group attached to a silicon atom which is in turn linked to another silicon through the $-R'''-$ group.

Mixtures of compounds can be employed which contain molecular species of varying molecular weights. Different oxime radicals and R radicals can appear in any one molecule or in any molecular mixture. On the other hand a pure species can be employed.

The compositions of this invention are stable in the absence of moisture. Consequently, they can be stored for prolonged periods of time without any deleterious effect. During this period of storage little or no change occurs in the physical properties of the compositions. This is of particular importance from a commercial standpoint, since it assures that once a composition is prepared with a certain consistency and cure time that neither will change appreciably upon storage. This stability on storage is the characteristic which makes the compositions of this invention particularly useful as one-component room temperature vulcanizing compositions.

The compounds of this invention can co-react merely by exposing them to atmospheric moisture with or without additional water vapor. The rate of co-reaction depends on the type of oxime radical in the reactants, the number of oxime radicals on any one silicon atom, the size of the R radicals in the oxime group and the size of any R' radicals attached to oxime-substituted silicon atoms. In general, an increase in the molecular weight of any type or R or R" radical in the oxime radicals or R' radicals on the oxime-substituted silicon atoms decreases the rate of co-reaction. These compounds can be co-reacted at elevated temperatures if desired or in the presence of condensation catalysts.

Typical classes of such condensation catalysts include, for example, certain organic amines, phosphoric acid salts of any basic amino compound, carboxylic acid salts of any basic amino compound, carboxylic acid salts of any quaternary ammonium hydroxide and carboxylic acid salts of any metal ranging from lead to manganese inclusive in the electromotive series of metals such as lead octoate, dibutyl tin diacetate, stannous octoate or dibutyl tin dilaurate.

Where a compound of this invention contains only two oxime radicals per molecule, the primary utility of such a material is as an intermediate in the preparation of block copolymers. These difunctional compounds can also be used in coating and calking applications in mixtures with polyfunctional materials, e.g. $Si(ON=X)_4$ or $R'Si[(OSiR'_2)_nON=X]_3$. Such a mixture cures in air at room temperature when cast as a thin film because the polyfunctional silanes or siloxanes react with the difunctional compounds rendering them immediately polyfunctional.

Where a compound of this invention contains an average of more than two oxime radicals per molecule, that compound is useful as an intermediate in one-component room-temperature-curing coating applications and calking applications.

The compounds of this invention are particularly adaptable for calking applications on buildings, airplanes, automotive equipment and the like. One of the desirable features is the fact that the compositions give a surface cure within 30 minutes or less after exposure to the atmosphere but they remain substantially soft for years. Furthermore, the compounds of this invention adhere tenaciously to a wide variety of materials such as glass, porcelain, wood, metals and organic plastics. For this reason they are particularly adaptable for practically any type of calking application.

Because the compounds of this invention combine the properties of a low temperature cure and good weatherability they are particularly adaptable for protective coatings on wood and other heat sensitive materials. Consequently, they extend the range of usefulness of organosiloxane coatings into areas which have not heretofore been open to such materials.

The physical properties of the compounds of this invention can be modified by mixing therewith other types of siloxanes and/or fillers. For example, it may be desirable to increase the adhesive qualities of the compounds of this invention by mixing therewith resinous siloxanes. These resinous siloxanes will also modify the elastic properties of the ultimate vulcanized compositions to make them more dough-like and less resilient. Such properties are highly desirable in certain calking applications. It also may be desirable to plasticize the vulcanized compositions of this invention by incorporation therein certain unreactive hydroxyl-free siloxane plasticizing agents such as trimethylsiloxy-endblocked dimethylsiloxanes or by employing diorganosiloxanes having SiOH groups and triorganosilyl groups in the same molecular.

The compounds of this invention can also be modified by incorporating therein any of the well-known reinforcing fillers such as fume silicas, silica aerogels and precipitated silicas of high surface area. These fillers, if desired, can have organosilyl groups attached to the surface thereof. The fillers employed herein can also be non-reinforcing fillers such as coarse silicas such as diatomaceous earth, crushed quartz or metallic oxides such as titania, ferric oxide, zinc oxide and the like. If desired, fibrous fillers such as asbestos or glass may also be employed. In short, any of the fillers commonly employed with silicone rubbers may be employed in the compositions of this invention. In all cases it is desirable that the filler be substantially dry before admixing with the composition although some water can be tolerated if an excess of the oxime silane is employed. It is best to mix the filler with the hydroxylated siloxane and then mix in an excess of the oxime-substituted silanes. This reduces to a minimum the chances of gelation of the mixture during preparation of formulated products containing fillers.

The fillers are usually employed to increase the strength of the elastomeric compositions and also to modify the flow characteristics of the uncured composition. The latter is particularly important in calking applications where it is undesirable to have any appreciable flow take place between the time the material is placed in the joint and the time curing occurs.

In addition to the above ingredients the compositions of this invention may contain any other desirable additive such as pigments, sun-screen agents, oxidation inhibitors and dielectric materials such as graphite and carbon black.

The following examples are illustrative and are not intended to limit this invention the scope of which is properly delineated in the claims. All quantitative measurements are in parts by weight. All viscosities were measured at 25° C. In these examples the symbols Et, Me, Vi and Ph represent the ethyl, methyl, vinyl and phenyl radicals respectively.

EXAMPLE 1

100 parts of a 110 cs. hydroxy-enblocked dimethylpolysiloxane dissolved in 300 parts of toluene were reacted with agitation at room temperature with 2 parts of $MeSiCl_3$ in contact with 5 parts of pyridine to give a toluene solution of a methyldichlorosiloxy-endblocked dimethylpolysiloxane.

This solution was decanted from the pyridine hydrochloride precipitate and mixed with 2 parts of acetone oxime dissolved in ethyl ether. The mixture was shaken for one hour, filtered free of pyridine hydrochloride and stripped of toluene and any residual pyridine. The product was a fluid having a viscosity slightly over 1200 cs. and consisting of a dimethylpolysiloxane endblocked with $(Me_2C=NO)_2SiMeO_{0.5}$ units.

This fluid cured to a rubbery solid in a thin film in air at room temperature in less than 16 hours. A portion of this fluid mixed with a relatively small amount of a reinforcing silica filler cured in a film of about 4 to 5 mm. thickness to a rubber in less than 96 hours in air at room temperature. The fluid was stable in a closed container for at least six days.

EXAMPLE 2

The experiment of Example 1 was repeated employing a hydroxy-endblocked dimethylpolysiloxane having a molecular weight of about 45,000 in place of the 1180 cs. siloxane employed in Example 1. The product was a fluid dimethylpolysiloxane having a viscosity between 17,000 cs. and 20,000 cs. and endblocked with $(Me_2C=NO)_2SiMeO_{0.5}$ units.

A sample of this fluid cured in thin section to a firm rubbery solid in 24 hours in air at room temperature.

EXAMPLE 3

A solution of 73 parts of acetone oxime in 357 parts of ethyl ether was added dropwise with stirring to a solution of 50 parts of $MeSiCl_3$ in 1300 parts of toluene and 88.4 parts of pyridine. As the exothermic reaction proceeded, additional toluene was added in small amounts to dilute the large volume of pyridine hydrochloride which formed. After the reaction was complete and the product mixture had cooled to room temperature, the product mixture was filtered, stripped of toluene and excess pyridine and distilled. The fraction boiling at 95° C. at 0.5 mm. Hg was $MeSi(ON=CMe_2)_3$ as verified by chemical analysis.

EXAMPLE 4

6.08 parts of $MeSi(ON=CMe_2)_3$ were added to 100 parts of a 6800 cs. hydroxy-endblocked dimethylpolysiloxane dissolved in toluene. The mixture was refluxed for 72 hours and subsequently stripped of toluene, acetone oxime and unreacted $MeSi(ON=CMe_2)_3$. The product was a fluid dimethylpolysiloxane (about 7000 cs.) endblocked with $(Me_2C=NO)_2SiMeO_{0.5}$ units.

EXAMPLE 5

A solution of 43 parts of acetone oxime in about 173 parts of toluene was added dropwise with stirring to a solution of 25 parts of $SiCl_4$, and 55 parts of alpha-picoline in 867 parts of toluene. After the addition was complete and the system had cooled to room temperature, the alpha-picoline hydrochloride was filtered out and the filtrate stripped of toluene and excess alpha-picoline. The product was distilled producing a fraction boiling in the range of 132° to 136° C. at 0.1 to 0.3 mm. Hg. This was $Si(ON=CMe_2)_4$ as verified by chemical analysis.

EXAMPLE 6

A solution of 50 parts of a 15,000 cs. hydroxy-endblocked dimethylpolysiloxane in about 220 parts of toluene was mixed with 2 parts of $Si(ON=CMe_2)_4$ in a toluene solution. After intermittent agitation for an hour the system was stripped of toluene yielding a fluid dimethylpolysiloxane endblocked with $(Me_2C=NO)_3SiO_{0.5}$ units and having a viscosity of about 15,000 cs.

A small portion of this product in a thin film in air at room temperature cured to a rubbery solid in 4 to 5 minutes. The fluid is stable on storage in a capped bottle but exhibits the same rapid rate of cure on exposure to air in thin films.

EXAMPLE 7

A solution of 36.1 parts of acetone oxime in 86.7 parts of toluene was added in several portions to a solution of 31.9 parts of $Me_2SiCl_2$ and 49 parts of pyridine in 173 parts of toluene. After the reaction had gone to completion, additional toluene was added to dilute the pyridine hydrochloride distribution. The pyridine hydrochloride was filtered out and the filtrate distilled. A fraction boiling at 86° to 89° C. at 13 mm. Hg was $Me_2Si(ON=CMe_2)_2$ as verified by chemical analysis.

EXAMPLE 8

A solution of 39.25 parts of benzophenone oxime in 173 parts of toluene and 71 parts of ethyl ether was added dropwise with stirring to a solution of 27.15 parts of Me₃SiCl and 19.8 parts of pyridine in 260 parts of toluene. The resulting pyridine hydrochloride was filtered out, and the filtrate was distilled. The fraction boiling at 107° to 110° C. at 0.3 mm. Hg was Me₃SiON=CPh₂ as verified by chemical analysis.

EXAMPLE 9

When a solution of 59.5 parts of Me₃SiCl and 43.3 parts of pyridine in 176 parts of xylene is added slowly with stirring to a solution of 40 parts of acetone oxime in 264 parts of xylene, the resulting pyridine hydrochloride is filtered and the filtrate is distilled, Me₃SiON=CMe₂ is produced boiling at 111° to 112° C.

EXAMPLE 10

A solution of 73 parts of acetone oxime in a mixture of 103.5 parts of dioxane and 136.8 parts of heptane was added to a mixture of 57.5 parts of methylhydrogendichlorosilane, 79.1 parts of pyridine and 273.6 parts of heptane. The system was agitated until the reaction temperature abated. The pyridine hydrochloride was filtered out and the filtrate was distilled. A compound of the formula MeHSi(ON=CMe₂)₂ was isolated boiling in the range of 95° to 100° C. at 20 mm. Hg.

EXAMPLE 11

When each of the following silanes is substituted mol per mol for the MeSiCl₃ in Example 3, the principal products are as follows:

Table I

| Silane | Product |
|---|---|
| PhSiCl₃ | PhSi(ON=CMe₂)₃ |
| C₆H₁₁SiCl₃ | C₆H₁₁Si(ON=CMe₂)₃ |
| C₁₈H₃₇SiCl₃ | C₁₈H₃₇Si(ON=CMe₂)₃ |
| ViSiCl₃ | ViSi(ON=CMe₂)₃ |
| C₆H₅CH₂SiCl₃ | C₆H₅CH₂Si(ON=CMe₂)₃ |
| BrC₆H₄SiCl₃ | BrC₆H₄Si(ON=CMe₂)₃ |
| Cl₂C₆H₃SiCl₃ | Cl₂C₆H₃Si(ON=CMe₂)₃ |
| CF₃CH₂CH₂SiCl₃ | CF₃CH₂CH₂Si(ON=CMe₂)₃ |
| C₃F₇CH₂CH₂SiCl₃ | C₃F₇CH₂CH₂Si(ON=CMe₂)₃ |
| CF₃CH₂CH₂CH(CF₃)CH₂SiCl₃ | CF₃CH₂CH₂CH(CF₃)CH₂Si(ON=CMe₂)₃ |
| CF₃C₆H₄SiCl₃ | CF₃C₆H₄Si(ON=CMe₂)₃ |
| NCCH₂CH₂SiCl₃ | NCCH₂CH₂Si(ON=CMe₂)₃ |

EXAMPLE 12

When each of the following oximes is substituted mol per mol for the acetone oxime in Example 5, the principal products are as follows:

Table II

| Oxime | Product |
|---|---|
| CH₂(CH₂)₃C=NOH | Si[ON=C(CH₂)₃CH₂]₄ |
| (Me₂CH)₂C=NOH | Si[ON=C(CHMe₂)₂]₄ |
| MePhC=NOH | Si(ON=CPhMe)₄ |
| (BrCH₂)(BrC₆H₄)C=NOH | Si[ON=C(C₆H₄Br)(CH₂Br)]₄ |
| ViPhC=NOH | Si(ON=CViPh)₄ |
| Me(ClC₆H₄)C=NOH | Si[ON=CMe(C₆H₄Cl)]₄ |
| CF₂(CF₂)₃C=NOH | Si[ON=C(CF₂)₃CF₂]₄ |
| (fluorenone oxime) C=NOH | Si[ON=C(fluorenyl)]₄ |
| CH₂CH=CHCH₂CH₂C=NOH | Si[ON=CCH₂CH=CHCH₂CH₂]₄ |

EXAMPLE 13

When each of the following hydroxylated organo-silicon compounds are refluxed in toluene for 72 hours with MeSi(ON=CMe₂)₃ in an amount equal to six mols of MeSi(ON=CMe₂)₃ per mol of silicon-bonded hydroxyl groups and subsequently the mixture is stripped of toluene, byproduced acetone oxime and unreacted MeSi(ON=CMe₂)₃ the principal product is as follows:

Table III

| Organosilicon Compound | Product |
|---|---|
| HO[SiPhMeO]₃₀H | (Me₂C=NO)₂SiMeO[SiPhMeO]₃₀SiMe(ON=CMe₂)₂ |
| HO[SiMe(CH₂CH₂CN)O]₁₀[SiMe₂O]₉₀H | (Me₂C=NO)₂SiMeO[SiMe(CH₂CH₂CN)O]₁₀[SiMe₂O]₉₀SiMe(ON=CMe₂)₂ |
| HO[SiMe(CH₂C₆H₅)O]₄[SiMeC₁₈H₃₇O]₁[SiMeViO]₂₀H | (Me₂C=NO)₂SiMeO[SiMe(CH₂C₆H₅)O]₄[SiMeC₁₈H₃₇O]₁[SiMeViO]₂₀SiMe(ON=CMe₂)₂ |
| HO[SiMe(CH₂CH₂CF₂O]₂₀H | (Me₂C=NO)₂SiMeO[SiMe(CH₂CH₂CF₂)O]₂₀SiMe(ON=CMe₂)₂ |
| HO[SiMe(C₆H₃Cl₂)O]₁₀₀H | (Me₂C=NO)₂SiMeO[SiMe(C₆H₃Cl₂)O]₁₀₀SiMe(ON=CMe₂)₂ |

Each of these products cures in a thin film to a solid in air at room temperature within 24 hours.

EXAMPLE 14

When $HO(SiHMeO)_7H$ is substituted mol per mol for the 1180 cs. hydroxy-endblocked dimethylpolysiloxane employed in Example 1, the principal product is $$(Me_2C{=}NO)_2SiMeO(SiHMeO)_7SiMe(ON{=}CMe_2)_2$$

which cures to a solid in a thin film in air at room temperature in less than 16 hours.

EXAMPLE 15

48.5 g. of vinyltrichlorosilane, 79.1 g. of pyridine and 400 ml. of heptane were mixed. 152.6 g. of ethylmethylketoxime was added in small portions with shaking and cooling. The pyridine HCl was filtered out and the solvent removed and the residue distilled to give the compound $C_2H_3Si[ON{=}C(CH_3)(C_2H_5)]_3$, B.P. 115° C. at .12 mm.

EXAMPLE 16

100 g. of a siloxane fluid of the average formula

was mixed with 3 g. of $C_2H_3Si(ON{=}CMeEt)_3$ and 200 cc. of xylene and 1 drop of a 1 percent solution of platinum in the form of a chloroplatinic acid solution in dimethylphthalate. The mixture was refluxed for 24 hours. The solvent was removed to give a fluid product of the average formula

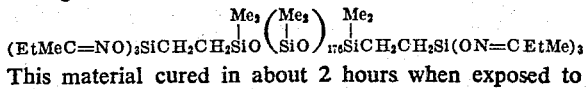

This material cured in about 2 hours when exposed to atmospheric moisture. A small amount of di-n-hexylamine was added to another sample and the sample cured in about 45 minutes when exposed to the atmosphere.

EXAMPLE 17

100 parts of a 10,000 cs. hydroxyl-endblocked dimethylsiloxane polymer fluid was mixed with 40 parts of a 1000 cs. trimethylsiloxy-endblocked dimethylpolysiloxane fluid, 4 parts of a hydroxyl-endblocked phenylmethylpolysiloxane and 15 parts of a fume silica. The mixture was milled to give a uniform mix.

9 parts of the silane, $C_2H_3Si(ON{=}CEtMe)_3$, was added and the above composition in an air-free Semco mixing pot and mixed for 20 strokes. The resulting product was packaged in aluminum tubes. It was stable in the absence of moisture, but upon exposure of a sample to the atmosphere the following cure rate was obtained.

The sample skinned over in 8 minutes, in less than one hour it was tack-free and in 7 days the sample had set to a rubber having the following properties:

Durometer _____ 20
Tensile strength at break _____p.s.i__ 140
Elongation at break _____percent__ 380

The cured material adhered well to metals and glass and performs satisfactory as a building sealant.

EXAMPLE 18

When the following silanes are reacted with the following compounds in accordance with the procedure of Example 16, the following products are obtained:

| Silane | Compound | Product |
| --- | --- | --- |
| Vi<br>\|<br>PhSi[ON=C(Ph)Me]₂ | $\left(\begin{array}{c}Me\\|\\HSiO\end{array}\right)_5$ | $\left[\begin{array}{c}Ph\quad Me\\|\quad\ \ |\\(Me[Ph]C{=}NO)_2SiCH_2CH_2SiO\end{array}\right]_5$ |
| $CH_2{=}CH(CH_2)_{16}Si[ON{=}CCH_2Br(C_6H_4Br)]_3$ | Me₂<br>\|<br>HSiOSiMe₃ | $[(BrC_6H_4)(BrCH_2)C{=}NO]_3Si(CH_2)_{18}\overset{Me_2}{\underset{\|}{Si}}OSiMe_3$ |
| $\overline{CH_2(CH_2)_3C}{=}N\overset{C_{18}H_{37}}{\underset{\|}{O}}SiCH_2CH{=}CH_2$ | Ph<br>\|<br>HSi(OSiMe₃)₂ | $\overline{CH_2(CH_2)_3C}{=}N\overset{C_{18}H_{37}}{\underset{\|}{O}}\overset{Ph}{\underset{\|}{Si}}(CH_2)_2Si(OSiMe_3)_2$ |
| $\overline{CF_2(CF_2)_3C}{=}N\overset{Me_2}{\underset{\|}{O}}SiCH{=}CH_2$ | $H\overset{Me_2}{\underset{\|}{Si}}\left(O\overset{Ph_2}{\underset{\|}{Si}}\right)_3O\overset{Me_2}{\underset{\|}{Si}}H$ | $\overline{CF_2(CF_2)_3C}{=}N\overset{Me_2}{\underset{\|}{O}}Si(CH_2)_2\overset{Me_2}{\underset{\|}{Si}}(O\overset{Ph_2}{\underset{\|}{Si}})_3O\overset{Me_2}{\underset{\|}{Si}}(CH_2)_2\underset{\|}{SiON}{=}C(CF_2)_3CF_2$ |
| Vi<br>\|<br>$CF_3CH_2CH_2Si(ON{=}CMe_2)_2$ | $\overset{Me_2}{\underset{\|}{HSiO}}\left[\begin{array}{c}CF_3\\|\\CH_2\\|\\CH_2\\|\\SiO\\|\\Me\end{array}\right]_{30}\overset{Me_2}{\underset{\|}{SiH}}$ | $(Me_2C{=}NO)_2Si(CH_2)_2\overset{Me_2}{\underset{\|}{Si}}O\left[\begin{array}{c}CF_3\\|\\CH_2\\|\\CH_2\\|\\SiO\\|\\Me\end{array}\right]_{30}\overset{Me_2}{\underset{\|}{Si}}OSi(CH_2)_2\overset{CF_3}{\underset{\|}{\underset{\|}{CH_2}}}Si(ON{=}CMe_2)_2$ |
| Vi<br>\|<br>$NCCH_2CH_2Si(ON{=}CMe_2)_2$ | $\overset{Ph}{\underset{\|}{HSi}}\left[\begin{array}{c}Ph\\|\\OSi\\|\\Me\end{array}\right]_{20}\overset{Ph}{\underset{\|}{OSiH}}\\ \ \ \ Me$ | $(Me_2C{=}NO)_2Si(CH_2)_2\overset{Ph}{\underset{\|}{Si}}O\left(\begin{array}{c}Ph\\|\\SiO\\|\\Me\end{array}\right)_{20}\overset{Ph}{\underset{\|}{Si}}(CH_2)_2Si(ON{=}CMe_2)_2\\ \ \ \ CH_2\\ \ \ \ |\\ \ \ \ CH_2\\ \ \ \ |\\ \ \ \ CN$ |
| $ViSi(ON{=}CMeEt)_3$ | Copolymer of 1 mol percent $HSiO_{1.5}$ and 99 mol percent $PhSiO_{1.5}$. | Copolymer of 1 mol percent $(EtMeC{=}NO)_3Si(CH_2)_2SiO_{1.5}$ and 99 mol percent $PhSiO_{1.5}$ |
| $ViSi(ON{=}CMeEt)_3$ | $\overset{Me_2}{\underset{\|}{HSiO}}\left[\begin{array}{c}H{-}C{-}Me\\\bigcirc\\|\\CH_2\\|\\SiO\\|\\Et\end{array}\right]_{30}\overset{Me_2}{\underset{\|}{SiH}}$ | $(EtMeC{=}NO)_3Si(CH_2)_2\overset{Me_2}{\underset{\|}{SiO}}\left[\begin{array}{c}H{-}C{-}Me\\\bigcirc\\|\\CH_2\\|\\SiO\\|\\Et\end{array}\right]_{30}\overset{Me_2}{\underset{\|}{Si}}(CH_2)_2Si(ON{=}CEtMe)_3$ |

| Silane | Compound | Product |
|---|---|---|
| ViSi(ON=CMe₂)₃ | HSi(OSiC₁₈H₃₇)₃ Me₂ | (Me₂C=NO)₃Si(CH₂)₂Si(OSiC₁₈H₃₇)₃ Me₂ |
| ViSi(ON=CMe₂)₃ | SiH₄ | [(Me₂C=NO)₃SiCH₂CH₂]₄Si |
| ViSi(ON=CMe₂)₃ ᵃ | Me₂SiH₂ | (Me₂C=NO)SiCH₂CH₂SiH Me₂ |
| ViSi(ON=CMe₂)₂ Ph | HSi(Ph)₂(C₁₈H₃₇) | (Me₂C=NO)₂Si(CH₂)₂SiC₁₈H₃₇ Ph Ph₂ |
| ViSi(ON=CMe₂)₂ C₆H₄Cl | HSi(CH₂CH₂CF₃)₃ | (Me₂C=NO)₂Si(CH₂)₂Si(CH₂CH₂CF₃)₃ C₆H₄Cl |
| 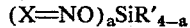<br>ViSiON=CMe₂<br>Me | HSi(ON=CMe₂)₂ | <br>Me₂C=NOSiCH₂CH₂Si(ON=CMe₂)₂<br>Me |
| Vi₂Si(ON=CMe₂)₂ ᵇ | HSiMe₃ | (Me₂C=NO)₂Si(CH₂)₂SiMe₃ Vi |
| ViSi(ON=CMe₂)₃ | HSi(ON=CMe₂)₃ | (Me₂C=NO)₃Si(CH₂)₂Si(ON=CMe₂)₃ |
| ViSi(ON=CMe₂)₃ | Me₃SiOSi(ON=CMe₂)₂ H | (Me₂C=NO)₃SiCH₂CH₂SiOSiMe₃ (ON=CMe)₂ |

ᵃ 4 mols of H₂SiMe₂ per mol of silane.
ᵇ 4 mols silane to one of HSiMe₃.

That which is claimed is:

1. A compound of the general formula $$(X=NO)_a SiR'_{4-a}$$

in which X is selected from the group consisting of radicals of the formula $R_2C=$ and

in which each R″ is selected from the group consisting of divalent hydrocarbon radicals and divalent halohydrocarbon radicals, each R is a radical selected independently from the group consisting of monovalent hydrocarbon radicals and halogenated monovalent hydrocarbon radicals, each R′ is a substituent selected independently from the group consisting of R radicals, cyanoalkyl radicals and hydrogen atoms and $a$ is a positive integer ranging in value from 1 to 4.

2. A compound of the general formula $$(R_2C=NO)_a SiR'_{4-a}$$

in which each R and R′ are monovalent hydrocarbon radicals and $a$ is a positive integer ranging in value from 1 to 4.

3. A compound of the general formula $$(R_2C=NO)_3 SiR'$$

in which each R and R′ are monovalent hydrocarbon radicals.

4. A compound of the general formula $$(R_2C=NO)_4 Si$$

in which each R is a monovalent hydrocarbon radical.

5. [(CH₃)₂C=NO]₃SiCH₃.
6. [(CH₃)₂C=NO]₄Si.
7. [(C₂H₅)(CH₃)C=NO]₃SiCH=CH₂.

8. A composition consisting essentially of organosiloxane having at least one siloxane unit of the formula

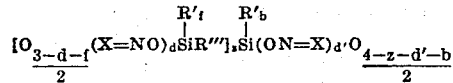

which unit contains at least one (X=NO) group and at least one SiO group of a SiOSi linkage, any remaining siloxane units in said organosiloxane being essentially all of the general formula $$\frac{R'_c SiO_{4-c}}{2}$$

in which X is selected from the group consisting of $R_2C=$ and

radicals in which each R is selected independently from the group consisting of monovalent hydrocarbon radicals and monovalent halohydrocarbon radicals and each R″ is selected independently from the group consisting of divalent hydrocarbon and divalent halohydrocarbon radicals, each R′ is selected independently from the group consisting of R radicals, cyanoalkyl radicals and hydrogen atoms, R‴ is a divalent aliphatic hydrocarbon radical, $b$ is an integer from 0 to 2 inclusive, $d$ and $d'$ are each integers from 0 to 3 inclusive, $f$ is an integer from 0 to 2 inclusive, $z$ is an integer from 0 to 1 inclusive and $c$ is an integer from 0 to 3 inclusive.

9. An organosiloxane consisting essentially of at least one unit of the general formula

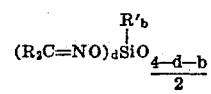

any other units being of the general formula $$\frac{R'_c SiO_{4-c}}{2}$$

in which R and R′ are each monovalent hydrocarbon radicals, $d$ is an integer from 1 to 3 inclusive, $b$ is an integer from 0 to 2 inclusive, the sum of $d+b$ being not greater than 3 and $c$ is an integer from 0 to 3 inclusive, there being in said siloxane on the average at least one R′ radical per silicon atom.

10. A composition of matter comprising (1) a siloxane polymer containing on the average per molecule more than two silicon-bonded units of the formula X=NO— in which X is selected from the group consisting of $R_2C=$ and

radicals, in which R is selected from the group consisting of monovalent hydrocarbon and monovalent halohydrocarbon radicals and R'' is selected from the group consisting of divalent hydrocarbon and divalent halohydrocarbon radicals, the remaining valences of the silicon atoms in said siloxane polymer being essentially all satisfied by oxygen atoms of SiOSi linkages and substituents selected from the group consisting of monovalent hydrocarbon radicals and monovalent halohydrocarbon radicals there being an average of about 2 of said substituents per silicone atom and (2) a filler.

11. A composition of matter comprising (1) a siloxane polymer containing on the average per molecule more than two silicon-bonded radicals of the formula $R_2C=NO-$ in which R is an alkyl radical of from 1 to 2 inclusive carbon atoms, the remaining valences of the silicon atoms in said siloxane being essentially all satisfied by oxygen atoms of SiOSi linkages and methyl radicals, there being an average of about 2 methyl radicals per silicon atom and (2) a filler.

12. A composition of matter comprising (1) a siloxane polymer containing on the average per molecule more than two silicon-bonded groups of the formula $R_2C=NO-$ in which R is an alkyl radical of from 1 to 2 inclusive carbon atoms, the remaining valences of said siloxane being essentially all satisfied by oxygen atoms of SiOSi linkages and both methyl and 3,3,3-trifluoropropyl radicals, there being an average of about 2 total of said radicals per silicon atom and (2) a filler.

13. The method comprising mixing in the substantial absence of moisture (1) a polysiloxane containing silicon-bonded hydroxyl groups in which essentially all the remaining valences of the silicon atoms in said polysiloxane are satisfied by oxygen atoms of SiOSi linkages and substituents selected from the group consisting of monovalent hydrocarbon radicals, monovalent halohydrocarbon radicals, cyanoalkyl radicals and hydrogen atoms, there being an average of at least one said substituent per silicon atom, with (2) a silane of the formula $R'_bSi(ON=X)_{4-b}$ in which R' is selected from the group consisting of monovalent hydrocarbon radicals and monovalent halohydrocarbon radicals, X is selected from the group consisting of $R_2C=$ and

radicals in which R is selected from the group consisting of monovalent hydrocarbon radicals and monovalent halohydrocarbon radicals and R'' is selected from the group consisting of divalent hydrocarbon radicals and divalent halohydrocarbon radicals and b is an integer from 0 to 2 inclusive, in amount such that there is at least one mol of silane per mol of silicon-bonded hydroxyl groups in (1), whereby a product is obtained which is stable in the absence of moisture, but cures when exposed to moisture.

14. The method comprising mixing in the substantial absence of moisture (1) a polysiloxane containing silicon-bonded hydroxyl groups in which essentially all the remaining valences of the silicon atoms in said siloxane are satisfied with oxygen atoms of SiOSi linkages and monovalent hydrocarbon radicals there being an average of about 2 monovalent hydrocarbon radicals per silicon atom, (2) a silane of the formula $R'_bSi(ON=CR_2)_{4-b}$ in which R' and R are each monovalent hydrocarbon radicals and b is an integer from 0 to 1 inclusive, in amount so that there is at least one mol of silane per mol of silicon-bonded hydroxyl in (1) and (3) a filler, whereby a product is obtained which is stable in the absence of moisture but cures in the presence of moisture.

15. The method comprising mixing in the substantial absence of moisture (1) a siloxane which is essentially a dimethylsiloxane containing silicon-bonded hydroxyl groups, (2) a silane of the formula $C_2H_3Si(ON=CR_2)_3$ in which R is an alkyl radical of from 1 to 2 inclusive carbon atoms and (3) a filler, in amount such that there is at least one mol of silane per mol of silicon-bonded hydroxyl in (1) whereby a product is obtained which is stable in the absence of moisture but cures upon exposure to moisture.

16. The method in accordance with claim 14 wherein (1) is a hydroxylated 3,3,3-trifluoropropylmethylsiloxane and (2) is a silane of the formula $C_2H_3Si(ON=CR_2)_3$ in which R is an alkyl radical of from 1 to 2 inclusive carbon atoms.

17. The method comprising exposing to moisture the composition of claim 8, whereby said siloxane cures.

18. The method comprising exposing to moisture the composition of claim 9, whereby said composition cures.

19. The method comprising exposing to moisture the composition of claim 10, whereby said composition cures.

20. The method comprising exposing to moisture the composition of claim 11, whereby said composition cures.

21. The method comprising exposing to moisture the composition of claim 12 whereby said composition cures.

22. A siloxane composed of units of the formula

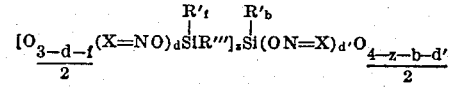

in which X is selected from the group consisting of $R_2C=$ and

radicals in which R is selected from the group consisting of monovalent hydrocarbon radicals and monovalent halohydrocarbon radicals and R'' is selected from the group consisting of divalent hydrocarbon and divalent halohydrocarbon radicals, R' is selected independently from the group R radicals, cyanoalkyl radicals and hydrogen atoms, R''' is a divalent aliphatic hydrocarbon radical, d and d' are each integers from 0 to 3 inclusive, b and f are each integers from 0 to 2 inclusive, z is an integer from 0 to 1 inclusive, each siloxane unit having at least one X=NO— group attached thereto.

23. The method comprising reacting in the substantial absence of moisture a halogen-endblocked siloxane composed of units of the general formula

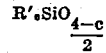

with an oxime of the formula X=NOH in amount such that there is at least one mol of oxime per mol of silicon-bonded halogen atoms, in said reactants X is selected from the group consisting of radicals of the formula $R_2C=$ and

in which each R'' is selected from the group consisting of divalent hydrocarbon radicals and halogenated divalent hydrocarbon radicals, each R being a radical selected independently from the group consisting of monovalent hydrocarbon radicals and halogenated monovalent hydrocarbon radicals, each R' is a substituent selected independently from the group consisting of R radicals, cyanoalkyl radicals and hydrogen atoms, and c ranging in value from 0 to 2, there being in each molecule of the siloxane component an average of at least one R radical per silicon atom whereby a siloxane containing ≡SiON=X groups is obtained.

24. A silane of the formula

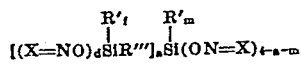

in which each X is selected from the group consisting of radicals of the formula $R_2C=$ and

in which R is selected from the group consisting of monovalent hydrocarbon radicals and monovalent halohydrocarbon radicals and R" is selected from the group consisting of divalent hydrocarbon radicals and divalent halohydrocarbon radicals, R' is a substituent selected independently from the group consisting of R radicals, cyanoalkyl radicals and H atoms, $d$ is an integer from 1 to 3 inclusive, $f$ is an integer from 0 to 2 inclusive, the sum of $d+f$ being not greater than 3, $a$ is an integer from 1 to 4 inclusive, $m$ is an integer from 0 to 3 inclusive and the sum of $a+m$ is not greater than 4.

25. The method comprising reacting (1) a silane of the formula

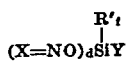

in which Y is an alkenyl radical, with (2) an organosilicon compound containing at least one silicon-bonded H atom whereby at least one SiH group in (2) adds to the C=C linkage in Y forming a product (3) containing at least one ≡SiR'''Si≡ linkage, in (1) X being selected from the group consisting of radicals of the group consisting of $R_2C=$ and

in which R is selected from the group consisting of monovalent hydrocarbon radicals and monovalent halohydrocarbon radicals and R" is selected from the group consisting of divalent hydrocarbon and divalent halohydrocarbon radicals, R' is a substituent selected independently from the group consisting of R radicals, cyanoalkyl radicals and H atoms $d$ is an integer from 1 to 3 inclusive, $f$ is an integer from 0 to 2 inclusive and the sum of $d+f$ is not greater than 3, any remaining valences of the silicon atom in (2) not satisfied by H atoms and any remaining valences of the silicon atoms in (3) not satisfied by any unreacted SiH groups and not satisfied by SiR'''Si linkages and (X=NO—) groups, being satisfied by substituents selected from the group consisting of oxygen atoms of SiOSi linkages, monovalent hydrocarbon radicals, monovalent halohydrocarbon radicals and cyanoalkyl radicals, in (3) R''' being a divalent aliphatic hydrocarbon radical.

References Cited by the Examiner
UNITED STATES PATENTS
2,907,782  10/59  Pike _____ 260—46.5

MURRAY TILLMAN, *Primary Examiner.*
WILLIAM H. SHORT, *Examiner.*

UNITED STATES PATENT OFFICE
CERTIFICATE OF CORRECTION

Patent No. 3,189,576                                           June 15, 1966

Edward Sweet

It is hereby certified that error appears in the above numbered patent requiring correction and that the said Letters Patent should read as corrected below.

Column 3, line 26, after "p,α-di-" insert -- bromoacetophe oxime. These oximes are well known --; column 5, line 8, the formula should appear as shown below instead of as in the patent lines 43 to 45, the third formula to the left of the column should appear as shown below instead of as in the patent:

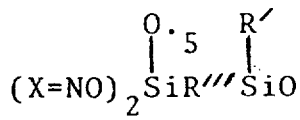

lines 60 to 62, the eleventh formula to the right.
of the column should appear as shown below instead of as in the patent:

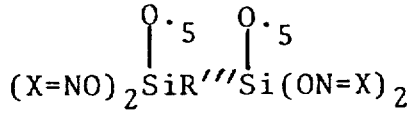

same column 5, lines 69 and 70, the last formula to the right of the column should appear as shown below instead of as in the patent:

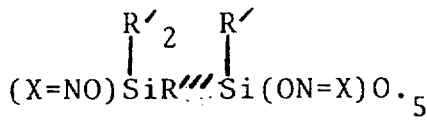

column 6, line 27, for "type or" read -- type of --; column 7, line 58, for "110 cs." read -- 1180 cs. --.

Signed and sealed this 4th day of January 1966.

(SEAL)
Attest:

ERNEST W. SWIDER                        EDWARD J. BRENNER
Attesting Officer                        Commissioner of Patents